US011383464B2

(12) United States Patent
Wilms et al.

(10) Patent No.: US 11,383,464 B2
(45) Date of Patent: Jul. 12, 2022

(54) DEVICE HAVING FREE-RUNNING COOLING ROLLERS FOR PRODUCING A FIBRE COMPOSITE MATERIAL IN THE FORM OF A FIBRE STRIP IMPREGNATED WITH POLYMER

(71) Applicant: Covestro Deutschland AG, Leverkusen (DE)

(72) Inventors: Christian Wilms, Neuss (DE); Herbert Börger, Markt Bibart (DE); Henning Börger, Nuremberg (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 184 days.

(21) Appl. No.: 16/481,301

(22) PCT Filed: Jan. 30, 2018

(86) PCT No.: PCT/EP2018/052221
§ 371 (c)(1),
(2) Date: Jul. 26, 2019

(87) PCT Pub. No.: WO2018/141718
PCT Pub. Date: Aug. 9, 2018

(65) Prior Publication Data
US 2021/0129459 A1 May 6, 2021

(30) Foreign Application Priority Data
Jan. 31, 2017 (EP) .................................. 17153855

(51) Int. Cl.
B29C 70/50 (2006.01)
B30B 3/00 (2006.01)
(Continued)

(52) U.S. Cl.
CPC ............ *B29C 70/504* (2013.01); *B29B 11/16* (2013.01); *B29B 15/122* (2013.01); *B29B 15/14* (2013.01);
(Continued)

(58) Field of Classification Search
CPC ....... B21B 27/021; B21B 27/024; B30B 3/04; B30B 3/005; B29C 2043/464; B29C 43/46; B29C 43/64; B29C 70/504; D21G 1/02
See application file for complete search history.

(56) References Cited

U.S. PATENT DOCUMENTS 375,679 A * 12/1887 Man .......................... B30B 3/04
100/160
406,711 A * 7/1889 Eynon et al. ............. B30B 5/02
59/63
(Continued)

FOREIGN PATENT DOCUMENTS

CN    104444499 A    11/2014
CN    104444499 A *  3/2015  ............... B30B 3/04
(Continued)

OTHER PUBLICATIONS

International Search Report for International Patent Application No. PCT/EP2018/052221, dated Apr. 11, 2018.
(Continued)

Primary Examiner — Benjamin A Schiffman
(74) Attorney, Agent, or Firm — K&L Gates LLP

(57) ABSTRACT

A device having at least one pair of free-running cooling rollers for the continuous production of a fibre strip impregnated with polymer, wherein the fibres are continuous fibres and the fibres in the impregnated fibre strip are aligned unidirectionally in the direction of travel of the impregnated fibre strip. Preferably, at least one of the two rollers is
(Continued)

equipped with a pair of sealing rings preferably of the same type. Also disclosed is a polymer-impregnated fiber strip, a process for producing a polymer-impregnated fiber strip, and a multilayer composite.

9 Claims, 3 Drawing Sheets

(51) Int. Cl.
  B32B 7/022     (2019.01)
  B29C 70/20     (2006.01)
  B29C 70/54     (2006.01)
  B29B 15/12     (2006.01)
  B29B 15/14     (2006.01)
  B29B 11/16     (2006.01)
  B30B 3/04      (2006.01)
  B29C 43/46     (2006.01)
  B29L 31/30     (2006.01)
  B29L 31/34     (2006.01)
  B21B 27/02     (2006.01)
  D21G 1/02      (2006.01)

(52) U.S. Cl.
  CPC .......... *B29C 43/46* (2013.01); *B29C 70/20* (2013.01); *B29C 70/54* (2013.01); *B30B 3/005* (2013.01); *B30B 3/04* (2013.01); *B32B 7/022* (2019.01); *B21B 27/021* (2013.01); *B21B 27/024* (2013.01); *B29C 2043/464* (2013.01); *B29L 2031/3041* (2013.01); *B29L 2031/3481* (2013.01); *B32B 2307/732* (2013.01); *B32B 2457/00* (2013.01); *B32B 2605/003* (2013.01); *D21G 1/02* (2013.01)

(56) References Cited

U.S. PATENT DOCUMENTS

| | | | | |
|---|---|---|---|---|
| 470,364 | A * | 3/1892 | Perkins | B30B 3/04 59/63 |
| 2,344,274 | A * | 3/1944 | Stacom | B30B 3/005 100/160 |
| 2,818,904 | A * | 1/1958 | Ambrose | B29C 70/542 156/555 |
| 3,975,126 | A * | 8/1976 | Wireman | B29C 48/92 425/141 |
| 4,028,035 | A * | 6/1977 | Komarek | B30B 11/16 425/363 |
| 4,080,888 | A * | 3/1978 | Bellis | B30B 3/04 100/47 |
| 4,325,245 | A * | 4/1982 | Sherwood | B21B 13/005 72/244 |
| 4,599,770 | A * | 7/1986 | Kato | B21B 27/05 492/1 |
| 4,768,434 | A * | 9/1988 | Beery | B30B 3/04 100/157 |
| 4,958,558 | A * | 9/1990 | Harreither | B21B 31/16 100/41 |
| 5,182,060 | A * | 1/1993 | Berecz | B29C 53/043 264/70 |
| 5,225,140 | A * | 7/1993 | Hayashikoshi | B32B 37/1027 264/571 |
| 5,352,110 | A * | 10/1994 | Hayakawa | B29C 43/22 264/175 |
| 5,850,785 | A * | 12/1998 | Vallius | D21F 3/0218 100/35 |
| 6,344,019 | B1 * | 2/2002 | Kusters | B30B 3/005 100/162 B |
| 8,568,853 | B2 | 10/2013 | Raghavendran et al. | |
| 9,334,607 | B2 * | 5/2016 | Borger | D06M 10/02 |
| 2004/0168585 | A1 * | 9/2004 | Aho | B30B 3/04 100/327 |
| 2008/0000557 | A1 | 1/2008 | Ghosh et al. | |
| 2010/0116407 | A1 | 5/2010 | Brentrup | |
| 2013/0228082 | A1 * | 9/2013 | Honjou | H01M 4/0435 100/176 |
| 2015/0136884 | A1 * | 5/2015 | Hoefter | B02C 4/305 241/67 |
| 2015/0176199 | A1 * | 6/2015 | Lenferink | B29C 70/202 442/103 |
| 2017/0056833 | A1 * | 3/2017 | Nguyen | B29C 66/8362 |
| 2018/0147804 | A1 * | 5/2018 | Jenter | F16C 33/7886 |
| 2019/0152210 | A1 * | 5/2019 | Nakajima | B32B 37/0053 |
| 2019/0263021 | A1 * | 8/2019 | Fabre | B29C 53/043 |

FOREIGN PATENT DOCUMENTS

| | | | | |
|---|---|---|---|---|
| CN | 110667160 | A * | 1/2020 | .......... B23D 35/007 |
| DE | 102010018421 | A1 * | 10/2011 | .............. B30B 3/04 |
| FR | 2651456 | A1 * | 3/1991 | .......... B23D 35/007 |
| JP | 02-048907 | A | 2/1990 | |
| JP | 02048907 | A * | 2/1990 | |
| JP | 04-219213 | A | 8/1992 | |
| WO | 2012123302 | A1 | 9/2012 | |
| WO | 2013187768 | A1 | 12/2013 | |

OTHER PUBLICATIONS

Written Opinion for International Patent Application No. PCT/EP2018/052221, dated Apr. 11, 2018.
International Preliminary Report on Patentability for International Patent Application No. PCT/EP2018/052221, dated Aug. 8, 2019. (English translation attached.).

* cited by examiner

US 11,383,464 B2

DEVICE HAVING FREE-RUNNING COOLING ROLLERS FOR PRODUCING A FIBRE COMPOSITE MATERIAL IN THE FORM OF A FIBRE STRIP IMPREGNATED WITH POLYMER

CROSS-REFERENCE TO RELATED APPLICATIONS

This application is a U.S. national stage application, filed under 35 U.S.C. § 371, of International Application No. PCT/EP2018/052221, which was filed on Jan. 30, 2018, and which claims priority to European Patent Application No. 17153855.6, which was filed on Jan. 31, 2017. The contents of each are incorporated by reference into this specification.

FIELD

The present invention provides an apparatus having at least one pair of free-wheeling chill rolls for continuous production of a polymer-impregnated fiber strip, wherein the fibers are continuous fibers and the fibers in the impregnated fiber strip are aligned unidirectionally in running direction of the impregnated fiber strip. Preferably, at least one of the two rolls is equipped with a pair of preferably identical gasket rings.

The present invention also provides a process for continuously producing a polymer-impregnated fiber strip with continuous fibers aligned unidirectionally in running direction of the impregnated fiber strip using the aforementioned apparatus.

The present invention also further provides an impregnated fiber strip that can be produced by the apparatus of the invention or the process of the invention, and a multilayer composite that can be produced from the impregnated fiber strip, and also for the use of this multilayer composite.

The longest axis of a fiber strip is also referred to as running direction. "Continuous fibers" is understood to mean that the length of the reinforcing fibers corresponds essentially to the dimension of the impregnated fiber strip to be reinforced in the fiber direction. "Unidirectionally" in association with "fiber" is understood to mean that the fibers in the impregnated fiber strip are aligned in just one direction. Forward direction is the direction in which the fiber strip is moved forward during its production. Forward direction and running direction are parallel to one another, but forward direction also has a sense of direction resulting from the forward motion of the fiber strip during its production.

BACKGROUND

The use of fiber-reinforced materials has steadily increased in the last decades on account of their outstanding specific properties. Fiber-reinforced materials are used especially in structures subject to acceleration, in order to allow a reduction in weight and hence minimize energy consumption without losses in strength or stiffness of the material.

A fiber-reinforced material, also called fiber composite or composite for short, is an at least biphasic material consisting of a matrix material in which fibers are essentially completely embedded and ensheathed. The matrix has a shaping function, is intended to protect the fibers from outside influences and is needed to transmit forces between the fibers and to introduce external loads. The fibers make a crucial contribution to the mechanical performance of the material, with glass, carbon, polymer, basalt or natural fibers often being used in industry. Depending on the intended use, matrix materials used are generally thermoset or thermoplastic polymers, occasionally even elastomers.

Thermoset polymers are already long established in a great many industries. However, a crucial disadvantage is the lengthy curing time which leads to correspondingly lengthy cycle times on processing to give components. This makes thermoset-based composites unattractive for high-volume industry applications in particular. By contrast, thermoplastic-based composites, if they are in the form of already fully consolidated semifinished products, for example of continuous fiber-reinforced sheets or profiles, are often merely heated, formed and cooled when subjected to further processing, which can nowadays be achieved in cycle times of well under one minute. The processing may also be combined with further process steps, for example insert-molding with thermoplastics, which makes it possible to achieve a very high degree of automation and integration of functions.

Reinforcing materials used are essentially semifinished textile products such as wovens, multi-ply scrims or non-wovens (e.g. batts, random-laid fiber mats etc). It is a characteristic of these forms of fiber reinforcement that the alignment of the fiber—and thus the force pathways in the later component—is already fixed in the semifinished textile product. While this does allow direct production of a multidirectionally reinforced composite, it has disadvantages in terms of flexibility of ply construction, mechanical properties and economic viability. In thermoplastic-based systems, these semifinished textile products are typically impregnated with polymer under the action of pressure and temperature and then cut to size and subjected to further processing as a cured sheet.

As well as these already established systems based on semifinished textile products, thermoplastic-based tapes, i.e. fiber strips impregnated with a thermoplastic polymer, are becoming increasingly important. These offer economic advantages since the process step of semifinished textile product production can be dispensed with. These thermoplastic-based tapes are suitable for producing multi-ply constructions, particularly also for producing multidirectional constructions.

A process and an apparatus for producing a unidirectionally continuous fiber-reinforced fiber strip are described in WO 2012 123 302 A1 for example, the disclosure of which is hereby fully incorporated into the description of the present invention by reference.

Also provided in the apparatus disclosed in WO 2012 123 302 A1 is a cooling unit identified by reference numeral 17, comprising two chill/calibration rolls identified by reference numeral 35.

Such chill/calibration rolls may, as in the prior art, typically be executed as cylindrical calenders with a constant gap. These rolls can be driven directly or indirectly by a drive apparatus, for example a motor, in such a way that they transmit a force in forward direction of the strip to the impregnated fiber strip that runs between them.

Such an arrangement of chill/calibration rolls has the disadvantage that the impregnated fiber strips produced therewith have a cross section that deviates significantly from the desired cross section of an elongated rectangle. More particularly, these impregnated fiber strips are thicker in the middle of the long sides of the cross section than in the outer regions of the cross section. In order to prevent this, the prior art makes use, for example, of pairs of chill/calibration rolls in which one of the two rolls, usually the lower roll, has an annular, raised edge region fixedly connected to the roll at either end. The other of the two rolls, usually the upper roll, then meshes between these edge regions. However, these impregnated fiber strips frequently have, on the very outside, burrs extending outward at right angles to the long sides at the edges of the long sides of the cross section. The reason for this is that matrix material of this fiber strip always penetrates into the interstices between the rings of one roll and the end faces of the roll that meshes between the rings in the processing of an impregnated fiber strip.

A way of getting round this is that the rings of the lower roll abut it loosely, meaning that there is always a clearance between roll and gasket ring. Preferably in accordance with the invention, there is a clearance between roll and ring in each case of 0 to 200 μm, more preferably of 12 to 56 μm, most preferably an H7/g6 fit. These rings can then be pressed laterally against the end faces of the upper roll, such that the interstices between the rings and the end faces of the upper roll are reduced. As a result, it is no longer possible for material to penetrate between the rings and the end faces of the roll, and so no burrs are formed any longer.

In order to obtain an impregnated fiber strip that differs only slightly from the desired cross section of an elongated rectangle, the impregnated fiber strips produced according to prior art have to be trimmed at the outer ends in longitudinal direction. Only in this way is it possible to provide an impregnated fiber strip usable for further processing, for example for the production of constructions made of multiple mutually bonded fiber strips. Otherwise, the effect of the deviations from the rectangular shape is that, on bonding of the fiber strip plies, gaps in the form of bubbles occur between the plies, which would weaken the cohesion of the plies. The burrs at the edges would also otherwise make it more difficult for the impregnated fiber strip to be rolled up in a space-saving and undamaged manner.

However, a disadvantage in the trimming of the impregnated fiber strip is the loss of material, which is costly especially when expensive starting materials, for example polycarbonate as thermoplastic matrix and carbon fibers as fiber material, are used.

As well as their high cost, polycarbonates have the further disadvantage with respect to the thermoplastics that are typically used of having little tendency to creep and hence having a propensity to crack under constant stress. This is highly problematic particularly in the case of use in composites comprising continuous fibers; this is because composites comprising continuous fibers in their polymer matrix are under constant stress as a result of the continuous fibers. For this reason, polycarbonates have played only a minor role to date in practice as polymer matrix for composites comprising such continuous fibers. However, it is desirable in principle to broaden the field of use of polycarbonates to include the impregnated fiber strips as well, because polycarbonates have low volume shrinkage on solidification compared to the other customary thermoplastics, such as polyamide or polypropylene. Polycarbonates further exhibit a higher glass transition temperature Tg, a greater heat resistance and a lower water absorption compared to other thermoplastics.

Furthermore, it is possible with fiber strips comprising polycarbonate as matrix material to provide a multilayer composite having an esthetically pleasing surface having low corrugation with simultaneously good mechanical properties. Such a multilayer composite constructed from fiber strips comprising polycarbonate as the matrix material exhibits metal-like tactile, optical and acoustic properties.

These properties also make such a multilayer composite suitable as a housing material for housings for electronic devices, in particular portable electronic devices such as laptops or smartphones, and for outer paneling and interior trim of automobiles, since such a multilayer composite can not only absorb mechanical load but also offers an excellent outward appearance.

In order to make polycarbonate amenable to the production of fiber strips, therefore, particular care also has to be taken in the cooling of the impregnated fiber strip, which is not assured in the prior art.

Moreover, the fiber strips produced by the arrangement described in WO 2012 123 302 A1 have a content of air pockets that likewise disrupts the further processing of the fiber strips. Here too, gaps in the form of bubbles occur, which in this case impair even the cohesion of the individual fiber strips. As a result, this then also weakens the coherence of constructions of multiple mutually bonded fiber strips.

SUMMARY

It is an object of the present invention to overcome the disadvantages of the prior art.

It is a particular object of the present invention to provide an apparatus with which it is possible to obtain an impregnated fiber strip in which the thickness of the impregnated fiber strip in the edge regions differs only slightly, if at all, from the desired thickness of the cross section.

In the context of the present invention, an only slight deviation from the desired thickness of the impregnated fiber strip means that the thickness differs from the desired thickness of the impregnated fiber strip by not more than a maximum of 20%, preferably not more than a maximum of 10%, more preferably not more than a maximum of 5%, more preferably not more than a maximum of 2%. At the same time, the cross section of the impregnated fiber strip should differ only slightly, if at all, from the desired cross section of an elongated rectangle. This means that the desired thickness of the fiber strip should be the same across its entire width.

It is a very particular object of the present invention to provide an apparatus with which an impregnated fiber strip can be obtained, in which the thickness of the impregnated fiber strip in the edge regions is only slightly greater, if at all, than the desired thickness of the cross section, where the cross section of the impregnated fiber strip should differ only slightly, if at all, from the desired cross section of an elongated rectangle. This means that the desired thickness of the fiber strip should be the same across its entire width.

In the context of the present invention, an only slightly greater thickness than the desired thickness of the impregnated fiber strip means that the thickness is greater than the desired thickness of the impregnated fiber strip by not more than a maximum of 20%, preferably not more than a maximum of 10%, more preferably not more than a maximum of 5%, more preferably not more than a maximum of 2%.

In the context of the present invention, the thickness is understood to mean the spatial dimension with the smallest spatial extent, where the thickness is aligned either at right angles to the width or to the running direction of the impregnated fiber strip.

"Edge region" in the context of the present invention refers to a region of the impregnated fiber strip which, on either side, in running direction, encompasses both in each case the outer edge itself of the impregnated fiber strip and at least the regions of the impregnated fiber strip that are up to 1%, preferably up to 2%, more preferably up to 5% and even more preferably up to 10% of the width of the impregnated fiber strip away from the respectively closest outer edge of the impregnated fiber strip.

Moreover, the impregnated fiber strip obtained is to contain not more than 5% by volume, preferably 2% by volume, more preferably 1% by volume, of air pockets.

It is also an object of the present invention to provide an apparatus with which impregnated fiber strips with polycarbonate as matrix material can be produced. These impregnated fiber strips with polycarbonate as matrix material should be suitable for the possibility of manufacture of multilayer composites having metal-like tactile, optical and acoustic properties and an excellent outward appearance and the ability to absorb mechanical load. Such multilayer composites are then suitable as housing material for housings of electronic devices, especially portable electronic devices such as laptops or smartphones, and for outer paneling and for interior trim of automobiles.

The object is achieved by the apparatus according to the present main claim. It is a characteristic feature of the apparatus of the invention that it has at least one pair of free-wheeling chill rolls.

In the context of the present invention, "free-wheeling chill rolls" means that these chill rolls are driven neither directly nor indirectly by a drive device, such that they do not transmit any force in forward direction of the strip to the impregnated fiber strip that runs between them. The chill rolls thus do not have any shaft by which they could be driven, but in each case merely an axis of rotation, also referred to hereinafter merely as "axis" or in the plural "axes", on which they can rotate, i.e. turn, in circumferential direction. The axes are mounted as frictionlessly as technically possible but with economically acceptable expenditure, and hence the turning motion is made as frictionless as technically possible but with economically acceptable expenditure. This low-friction mounting makes the rolls capable of free running.

BRIEF DESCRIPTION OF THE DRAWINGS

The features and advantages of the examples, and the manner of attaining them, will become more apparent and the examples will be better understood by reference to the following description taken in conjunction with the accompanying drawings, wherein.

Figure 1:
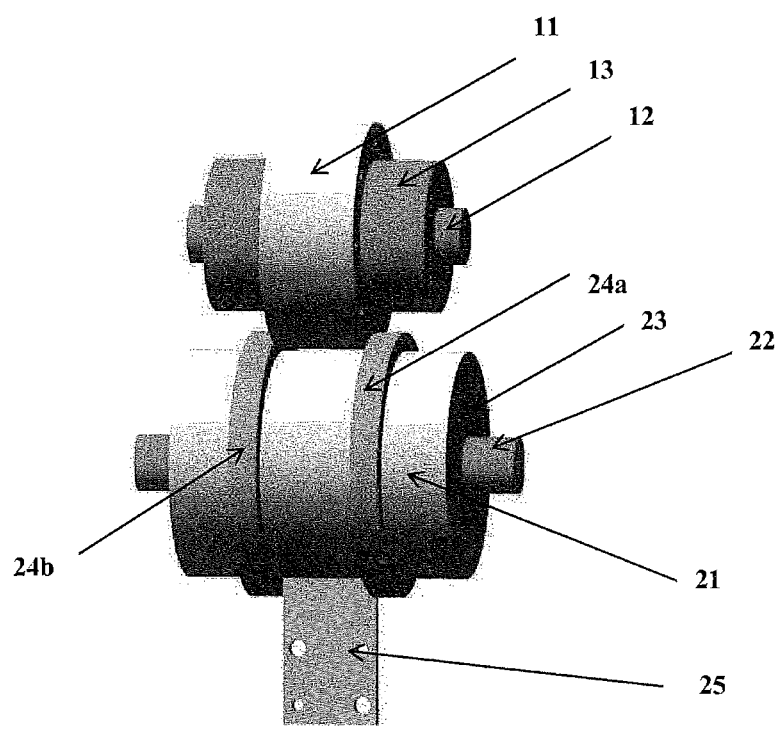
FIG. 1 shows, in simplified form, the apparatus of the invention with a pair of chill rolls arranged one above the other.

The exemplifications set out herein illustrate certain embodiments, in one form, and such exemplifications are not to be construed as limiting the scope of the examples in any manner.

DETAILED DESCRIPTION

Although the chill rolls can be driven by the impregnated fiber strip that runs between them, this is not considered to be "driven" in association with "chill roll", "chill rolls" in the context of the present invention. The "chill rolls" are also referred to hereinafter as "rolls" or in the singular "roll" for short.

Preferably in accordance with the invention, the rolls of a pair of chill rolls are arranged such that the axes of rotation of the rolls are parallel to one another. All details relating to the three-dimensional arrangement of the rolls in this document proceed from the assumption that the rolls of a pair of rolls are arranged one on top of the other; this arrangement is preferred. These rolls may be arranged exactly vertically one on top of the other or may be offset by an angle W in circumferential direction. This angle may be from 0° (rolls directly one on top of the other) to 90° (rolls horizontally alongside one another). This angle is preferably between 0° and 15°, more preferably 0° to 3°, most preferably 0°. If the offset chosen is too large, the impregnated fiber strip will "nestle" more closely against the front roll in forward direction, which means that the surface of the impregnated fiber strip facing said roll is cooled more significantly than the side facing away from said roll. This leads to differences between the two surfaces of the impregnated fiber strip. This is undesirable since it can lead to difficulties in the further processing of the impregnated fiber strip, and can also worsen the esthetic quality of the surface of the impregnated fiber strip. Alternatively, it is possible that the rolls are aligned vertically alongside one another or in any other spatial alignment between the horizontal and vertical direction relative to one another, provided that it is ensured that the axes of rotation of the rolls are parallel to one another. For example, the impregnated fiber strip can also run vertically through the rolls from the top downward, where the rolls are arranged horizontally alongside one another. In the description of the invention which follows, the starting point used in linguistic terms is the preferred case that the rolls are arranged horizontally one on top of the other when the spatial arrangement of the rolls is being discussed, for example relative to one another or in relation to the environment. If the rolls are aligned vertically alongside one another or in another spatial arrangement between the horizontal and vertical alignment relative to one another, the spatial references should be theoretically brought into line with the three-dimensional alignment, which does not present any difficulty to a person of average skill in the art.

The length of one of the two rolls is shorter than that of the other, where the shorter roll is preferably the upper roll. The length of the shorter roll is preferably 10% to 90%, preferably 15% to 85%, of the length of the longer roll. The length of the longer roll fully overlaps the length of the shorter roll, but the shorter roll may, but need not, be arranged centrally relative to the longer roll.

The diameters of the rolls are preferably the same. However, the rolls may also have different diameters. In this case, the diameter of the thinner roll is between 50% and 99%, preferably 80% to 90%, of the diameter of the thicker roll. However, the diameters are preferably the same. If the difference in thickness chosen is too great, the thinner roll exerts a greater pressure on the side of the impregnated fiber strip that faces it than the thicker roll does on the side facing the thicker roll. This leads to differences between the two surfaces of the impregnated fiber strip. This is undesirable since it can lead to difficulties in the further processing of the impregnated fiber strip, and can also worsen the esthetic quality of the surface of the impregnated fiber strip.

In the context of the present invention, the rolls are the cylindrical bodies, the mutually facing parts of the surfaces of which are closest in the case of parallel alignment of their axes. The axes of the rolls may, for example, also be cylindrical bodies, but the mutually facing parts of the axes are further removed from one another than the mutually facing parts of the rolls. It is also possible for one or both of the rolls to be arranged on a roller in each case, where this roller may also be a cylindrical body. A roll is arranged coaxially with its axis—and, if present, with its roller.

At least one of the two rolls of a pair of chill rolls is mounted here such that the distance between the two rolls, i.e. the gap, is variable, where the axes of the rolls and hence the rolls themselves remain parallel in the event of a change in the gap. This can be achieved, for example, by a mounting of at least one of the rolls which is movable in vertical direction; at least one of the two axes is thus arranged so as to be movable in the direction of a theoretical axis that intersects the axes of both rolls at right angles. Preferably, just one of the rolls is mounted such that the gap is variable. If the rolls are arranged one on top of the other, preferably just the upper roll is mounted such that the gap is variable.

If no other forces apart from weight are acting on the movably mounted roll, it is in the 0 position. Proceeding from this 0 position, the gap can only become greater than or equal to the gap in 0 position. Preferably, the rolls do not touch in the 0 position, meaning that a gap is already preset. Preferably, this preset gap, however, is less than the thickness of the impregnated fiber strip, where the gap, at a temperature of the apparatus of 15 to 25° C.—for example when the apparatus is out of operation—has an extent of 220 to 315 μm, preferably of 225 to 265 μm. At an operating temperature of the apparatus of 70 to 110° C., preferably 85 to 95° C., the gap has an extent of 5 to 100 μm, preferably 10 to 50 μm.

The movably mounted roll has a resilience force with respect to changes in its position from the 0 position. This counteracts an increase in size of the gap. This resilience force may be the weight of the movably mounted roll. Additionally or—according to the position of the pair of rolls in space—alternatively, beyond the weight of the roll, an additional force may oppose the change in position of the roll in vertical direction. For example, the resilience force of the roll may be increased by a resilience apparatus with the aid of pneumatic pressure, and in turn, for example, by pneumatic or hydraulic cylinders, spring force, additional weights or in some other technically viable manner. Preferably, the pneumatic pressure, the spring force, the additional weight or the force exerted in some other way acts on the roll via the axis thereof. This additional force acts radially from the axis of the roll in gap direction. If there is a material that increases the size of the gap in the gap between the rolls, the additional force acts on the material and hence counters the increase in the size of the gap. However, the additional force does not exert any force in circumferential direction of the roll or tangentially to the roll. The total deflection of the movably mounted roll is not more than 200%, preferably 150%, more preferably 120%, even more preferably 110%, of the desired thickness of the impregnated fiber strip.

If there is an impregnated fiber strip in the gap, or more particularly an impregnated fiber strip runs through the rolls of the invention, it is compressed in the gap, i.e. its thickness is reduced. Since the impregnated fiber strip runs between the rolls successively with its entire length, this reduction in the thickness in the gap takes place over the entire length of the impregnated fiber strip. More particularly, the thickness of the impregnated fiber strip is standardized by this operation, meaning that the difference between the greatest thickness of the impregnated fiber strip and the smallest thickness of the impregnated fiber strip is reduced.

What is more particularly achieved by the arrangement of the rolls in accordance with the invention is that, in the edge regions, the thickness of the impregnated fiber strip differs only slightly, if at all, from the desired thickness of the impregnated fiber strip. Preferably, in the edge regions of the impregnated fiber strip, the thickness differs from the desired thickness of the impregnated fiber strip by not more than a maximum of 20%, preferably not more than a maximum of 10%, more preferably not more than a maximum of 5%, more preferably not more than a maximum of 2%. At the same time, the cross section of the impregnated fiber strip differs only slightly, if at all, from the desired cross section of an elongated rectangle; this means that the desired thickness of the impregnated fiber strip is the same across its entire width.

What is very especially achieved by the arrangement of the rolls in accordance with the invention is that, in the edge regions, the thickness of the impregnated fiber strip is only slightly greater, if at all, than the desired thickness of the impregnated fiber strip. Preferably, in the edge regions of the impregnated fiber strip, the thickness is greater than the desired thickness of the impregnated fiber strip by not more than a maximum of 20%, preferably not more than a maximum of 10%, more preferably not more than a maximum of 5%, more preferably not more than a maximum of 2%. At the same time, the cross section of the impregnated fiber strip differs only slightly, if at all, from the desired cross section of an elongated rectangle; this means that the desired thickness of the impregnated fiber strip is the same across its entire width.

Furthermore, the number of air pockets and the volume of trapped air is distinctly reduced, specifically to a content of less than 1% by volume, and more homogeneous distribution of the fibers in the surrounding thermoplastic is achieved.

Preferably, at least one of the rolls of a pair of chill rolls has two preferably identical gasket rings arranged coaxially thereon relative to the roll in question, where the gasket rings may have a mirror-symmetric configuration relative to one another. As known to the person skilled in the art from customary clearance fits, the clear internal diameter of these gasket rings is slightly greater than the external diameter of the roll, such that the gasket rings are both rotatable in peripheral direction of the roll and movable in axial direction without the gasket rings forming an imbalance or being induced to vibrate on rotation of the roll. As already described further up, preferably in accordance with the invention, there is a clearance between roll and ring of 0 to 200 μm, more preferably of 12 to 56 μm, most preferably an H7/g6 fit. The gasket rings are preferably arranged on the roll of a pair of rolls which is not mounted so as to be movable in vertical direction.

If one roll has these two gasket rings, the two rolls have different lengths and the gasket rings are arranged on the longer of the two rolls. The shorter of the two rolls in that case is arranged such that it meshes partly between the two gasket rings, where the length of the roll is slightly less than the distance between the gasket rings. In practice, the distance between the two gasket rings is matched to the length of the shorter roll. The thickness of the gasket rings is preferably at least as great as the maximum total deflection of the movably mounted roll. The thickness of a gasket ring here is understood to mean the difference between the outer radius and the inner radius of a gasket ring. The gasket rings and the rolls are arranged symmetrically in axial direction preferably relative to a theoretical axis that intersects with the axes of the two rolls at right angles. In order to facilitate meshing of the movably mounted roll between the gasket rings, the gasket rings preferably have a bevel on the sides facing the intermeshing roll. The angle F of the bevel is preferably 5° to 45°, preferably 15° to 30°. This bevel is solely on the outer edges of the gasket rings.

A spacer is preferably disposed between the gasket rings. This spacer may, in a very simple case, be configured, for example, in the form of a rectangular sheet, where the width of the sheet determines the distance between the gasket rings. This spacer, based on the axis of the roll on which the gasket rings are arranged, is offset relative to the other roll preferably by 120° to 240°, preferably 150° to 210°, more preferably from 175° to 185°, especially by 180°. In this way, the gasket rings on the roll are prevented from canting on rotation of the roll. The spacer does not touch the roll. Alternatively, it is possible to dispense with the spacers.

Preferably, a spacer device outside the rings is also directly adjacent to each of the two gasket rings. This prevents axially outward movement of a gasket ring on the roll. The spacer device may take the form, for example, of a wheel movably mounted on a bar. The spacer device determines the distance of a gasket ring from the outer end of the roll. Alternatively, one spacer device or both spacer devices may also each be replaced by a contact pressure device.

The two rolls thus form an opening with a rectangular cross section together with the two gasket rings.

More particularly, what is achieved by the inventive arrangement of the gasket rings is that the width of the impregnated fiber strip does not differ from the desired width of the impregnated fiber strip at any point by more than 2%, preferably at any point by more than 1%, more preferably at any point by more than 0.5%, even more preferably at any point by more than 0.2%, especially at any point by more than 0.1%.

In the context of the present invention, an impregnated fiber strip has a matrix consisting to an extent of at least 50 wt %, preferably at least 70 wt %, more preferably at least 90 wt %, of one or more thermoplastics. The thermoplastic is preferably selected from one or more of the group comprising polycarbonate, polyamide, polyethylene, polypropylene, polyphenylene sulfone, polyetherimide, a polyether ketone such as polyetheretherketone, polyetherketoneketone, polyetheretheretherketone, polyetheretherketoneketone, poly(etherketone-etherketoneketone) and thermoplastic polyurethane. Thermoplastic polycarbonate is particularly preferred.

In addition, the matrix material may contain up to 50.0 wt %, preferably up to 30 wt %, more preferably up to 10 wt %, of customary additives.

This group comprises flame retardants, anti-drip agents, thermal stabilizers, demolding agents, antioxidants, UV absorbers, IR absorbers, antistats, optical brighteners, light-scattering agents, colorants such as pigments, including inorganic pigments, carbon black and/or dyes, and inorganic fillers in amounts customary for polycarbonate. These additives may be added individually or else in a mixture.

Such additives as are typically added in the case of polycarbonates are described, for example, in EP-A 0 839 623, WO-A 96/15102, EP-A 0 500 496 or "Plastics Additives Handbook", Hans Zweifel, 5th Edition 2000, Hanser Verlag, Munich.

When reference is made here to polycarbonate this also comprehends mixtures of different polycarbonates. Polycarbonate is furthermore used here as an umbrella term and thus comprises both homopolycarbonates and copolycarbonates. The polycarbonates may further be linear or branched in known fashion.

It is preferable when the polycarbonate consists to an extent of 70 wt %, preferably 80 wt %, more preferably 90 wt % or essentially, in particular to an extent of 100 wt %, of a linear polycarbonate.

The polycarbonates may be produced in known fashion from diphenols, carbonic acid derivatives and optionally chain terminators and branching agents. Particulars pertaining to the production of polycarbonates have been well known to a person skilled in the art for at least about 40 years. Reference may be made here by way of example to Schnell, Chemistry and Physics of Polycarbonates, Polymer Reviews, Volume 9, Interscience Publishers, New York, London, Sydney 1964, to D. Freitag, U. Grigo, P. R. Müller, H. Nouvertné, BAYER AG, Polycarbonates in Encyclopedia of Polymer Science and Engineering, Volume 11, Second Edition, 1988, pages 648-718 and finally to U. Grigo, K. Kirchner and P. R. Müller, Polycarbonate [Polycarbonates] in Becker/Braun, Kunststoff-Handbuch [Plastics Handbook], volume 31, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Aromatic polycarbonates are produced for example by reaction of diphenols with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of diphenols with diphenyl carbonate, for example, is likewise possible. Diphenols suitable for the preparation of polycarbonates are for example hydroquinone, resorcinol, dihydroxydiphenyls, bis(hydroxyphenyl)alkanes, bis(hydroxyphenyl)cycloalkanes, bis(hydroxyphenyl) sulfides, bis (hydroxyphenyl) ethers, bis(hydroxyphenyl) ketones, bis (hydroxyphenyl) sulfones, bis(hydroxyphenyl) sulfoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds.

In the case of the diphenols based on phthalimides, preference is given to using for example 2-aralkyl-3,3'-bis (4-hydroxyphenyl)phthalimides or 2-aryl-3,3'-bis(4-hydroxyphenyl)phthalimides such as 2-phenyl-3,3'-bis(4-hydroxyphenyl)phthalimide, 2-alkyl-3,3'-bis(4-hydroxyphenyl)phthalimides, such as 2-butyl-3,3'-bis(4-hydroxyphenyl)phthalimides, 2-propyl-3,3'-bis(4-hydroxyphenyl)phthalimides, 2-ethyl-3,3'-bis(4-hydroxyphenyl)phthalimides or 2-methyl-3,3'-bis(4-hydroxyphenyl)phthalimides and also diphenols based on isatins substituted at the nitrogen such as 3,3-bis(4-hydroxyphenyl)-1-phenyl-1H-indol-2-one or 2,2-bis (4-hydroxyphenyl)-1-phenyl-1H-indol-3-one.

Preferred diphenols are 4,4'-dihydroxydiphenyl, 2,2-bis (4-hydroxyphenyl)propane (bisphenol A), 2,4-bis(4-hydroxyphenyl)-2-methylbutane, 1,1-bis(4-hydroxyphenyl)-p- diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and other suitable diphenols are described for example in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph H. Schnell, Chemistry and Physics of Polycarbonates, Interscience Publishers, New York 1964 and also in JP-A 620391986, JP-A 620401986 and JP-A 1055501986.

Only one diphenol is used in the case of the homopolycarbonates, and two or more diphenols in the case of the copolycarbonates.

Examples of suitable carbonic acid derivatives include phosgene or diphenyl carbonate. Suitable chain terminators that may be used in the preparation of the polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched C1- to C30-alkyl radicals, preferably unsubstituted or tert-butyl-substituted. Particularly preferred chain terminators are phenol, cumylphenol and/or p-tert-butylphenol. The amount of chain terminator to be used is preferably 0.1 to 5 mol %, based on moles of diphenols used in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4-dihydroxytriphenyl)methyl)benzene and 3,3-bis(3-methyl-4-hydroxyphenyl)-2-oxo-2,3-dihydroindole.

The amount of the branching agents for optional use is preferably from 0.05 mol % to 3.00 mol % based on moles of diphenols used in each case. The branching agents can either be initially charged with the diphenols and the chain terminators in the aqueous alkaline phase or added dissolved in an organic solvent before the phosgenation. In the case of the transesterification process, the branching agents are used together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Furthermore, copolycarbonates may also be used. These copolycarbonates can be prepared using 1 wt % to 25 wt %, preferably 2.5 wt % to 25 wt %, more preferably 2.5 wt % to 10 wt %, based on the total amount of diphenols to be used, of polydiorganosiloxanes having hydroxyaryloxy end groups. These are known (U.S. Pat. Nos. 3,419,634, 3,189, 662, EP 0 122 535, U.S. Pat. No. 5,227,449) and producible by literature processes. Likewise suitable are polydiorganosiloxane-containing copolycarbonates; the production of polydiorganosiloxane-containing copolycarbonates is described in DE-A 3 334 782 for example.

The polycarbonates may be present alone or as a mixture of polycarbonates. It is also possible to use the polycarbonate or the mixture of polycarbonates together with one or more plastics other than polycarbonate as blend partners.

Blend partners that can be used include polyamides, polyesters, in particular polybutylene terephthalate and polyethylene terephthalate, polylactide, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly (methyl)methacrylate, polyphenylene oxide, polyphenylene sulfide, polyetherketone, polyaryletherketone, styrene polymers, in particular polystyrene, styrene copolymers, in particular styrene-acrylonitrile copolymer, acrylonitrile-butadiene-styrene block copolymers and polyvinyl chloride.

Polyamides suitable in accordance with the invention are likewise known or producible by literature processes.

Polyamides suitable in accordance with the invention are known homopolyamides, copolyamides and mixtures of these polyamides. These may be semicrystalline and/or amorphous polyamides. Suitable semicrystalline polyamides include polyamide-6, polyamide-6,6 and mixtures and corresponding copolymers of these components. Also contemplated are semicrystalline polyamides whose acid component consists entirely or partly of terephthalic acid and/or isophthalic acid and/or suberic acid and/or sebacic acid and/or azelaic acid and/or adipic acid and/or cyclohexane dicarboxylic acid, whose diamine component consists entirely or partly of m- and/or p-xylylenediamine and/or hexamethylenediamine and/or 2,2,4-trimethylhexamethylenediamine and/or 2,4,4-trimethylhexamethylenediamine and/or isophoronediamine and whose composition is known in principle.

Mention may also be made of polyamides produced entirely or partly from lactams having 7 to 12 carbon atoms in the ring, optionally with co-use of one or more of the abovementioned starting components.

Particularly preferred semicrystalline polyamides are polyamide-6 and polyamide-6,6 and mixtures thereof. Amorphous polyamides that may be used include known products. These are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis(aminomethyl)norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of two or more monomers, as are copolymers produced by addition of aminocarboxylic acids such as ε-aminocaproic acid, ω-aminoundecanoic acid or ω-aminolauric acid or lactams thereof.

Particularly suitable amorphous polyamides are polyamides produced from isophthalic acid, hexamethylenediamine and further diamines such as 4,4-diaminodicyclohexylmethane, isophoronediamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and laurolactam; or from terephthalic acid and the isomer mixture composed of 2,2,4- and/or 2,4,4-trimethylhexamethylenediamine.

Instead of pure 4,4'-diaminodicyclohexylmethane it is also possible to use mixtures of the geometrically isomeric diaminodicyclohexylmethanes composed of 70 to 99 mol % of the 4,4'-diamino isomer,
1 to 30 mol % of the 2,4'-diamino isomer and
0 to 2 mol % of the 2,2'-diamino isomer, optionally correspondingly more-highly condensed diamines obtained by hydrogenation of technical-grade diaminodiphenylmethane. Up to 30% of the isophthalic acid may be replaced by terephthalic acid.

The polyamides preferably have a relative viscosity (measured using a 1 wt % solution in m-cresol at 25° C.) of 2.0 to 5.0, more preferably of 2.5 to 4.0.

Thermoplastic polyurethanes suitable in accordance with the invention are likewise known or producible by literature processes.

An overview of the production, properties and applications of thermoplastic polyurethanes (TPU) may be found for example in Kunststoff Handbuch [G. Becker, D. Braun], volume 7 "Polyurethane", Munich, Vienna, Carl Hanser Verlag, 1983.

TPUs are usually constructed from linear polyols (macrodiols), such as polyester, polyether or polycarbonate diols, organic diisocyanates and short-chain, mostly difunctional alcohols (chain extenders). Said TPUs may be produced in continuous or batchwise fashion. The best-known production processes are the belt process (GB-A 1 057 018) and the extruder process (DE-A 19 64 834).

The thermoplastic polyurethanes used are reaction products of
I) organic diisocyanates
II) polyols
III) chain extenders.

Diisocyanates (I) that may be used include aromatic, aliphatic, araliphatic, heterocyclic and cycloaliphatic diisocyanates or mixtures of these diisocyanates (cf HOUBEN-WEYL "Methoden der organischen Chemie", Volume E20 "Makromolekulare Stoffe", Georg Thieme Verlag, Stuttgart, New York 1987, pp. 1587-1593 or Justus Liebigs Annalen der Chemie, 562, pages 75 to 136).

Specifically, mention may be made for example of: aliphatic diisocyanates, such as hexamethylene diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate and also the corresponding isomer mixtures, 4,4'-dicyclohexylmethane diisocyanate, 2,4'-dicyclohexylmethane diisocyanate and 2,2'-dicyclohexylmethane diisocyanate and also the corresponding isomer mixtures, aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanato-1,2-diphenylethane and 1,5-naphthylene diisocyanate. Preference is given to using 1,6-hexamethylene diisocyanate, isophorone diisocyanate, dicyclohexylmethane diisocyanate, diphenylmethane diisocyanate isomer mixtures having a 4,4'-diphenylmethane diisocyanate content of >96 wt % and in particular 4,4'-diphenylmethane diisocyanate and 1,5-naphthylene diisocyanate. These diisocyanates can be used individually or in the form of mixtures with one another. They may also be used together with up to 15 wt % (based on the total amount of diisocyanate) of a polyisocyanate, for example triphenylmethane 4,4',4"-triisocyanate or polyphenylpolymethylene polyisocyanates.

Zerewitinoff-active polyols (II) are those having on average not less than 1.8 to not more than 3.0 zerewitinoff-active hydrogen atoms and a number-average molecular weight $\overline{M}_n$ of 500 to 10,000 g/mol, preferably 500 to 6000 g/mol.

This includes, in addition to compounds comprising amino groups, thiol groups or carboxyl groups, in particular compounds comprising two to three, preferably two, hydroxyl groups, specifically those having number-average molecular weights $\overline{M}_n$ of 500 to 10,000 g/mol, more preferably those having a number-average molecular weight $\overline{M}_n$ of 500 to 6000 g/mol, for example hydroxyl-containing polyesters, polyethers, polycarbonates and polyesteramides or mixtures thereof.

Suitable polyether diols may be produced by reacting one or more alkylene oxides having 2 to 4 carbon atoms in the alkylene radical with a starter molecule comprising two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides can be used individually, in alternating succession or as mixtures. Examples of useful starter molecules include: water, amino alcohols, such as N-alkyldiethanolamines, for example N-methyldiethanolamine, and diols such as ethylene glycol, 1,3-propylene glycol, 1,4-butanediol and 1,6-hexanediol. It is optionally also possible to use mixtures of starter molecules. Suitable polyetherols further include the hydroxyl-containing polymerization products of tetrahydrofuran. Trifunctional polyethers may also be used in proportions of 0 to 30 wt % based on the bifunctional polyethers but at most in an amount that provides a product that is still thermoplastically processable. The essentially linear polyether diols preferably have number-average molecular weights $\overline{M}_n$ of 500 to 10,000 g/mol, more preferably 500 to 6000 g/mol. They may be used either individually or in the form of mixtures with one another.

Suitable polyester diols may be produced from, for example, dicarboxylic acids having 2 to 12 carbon atoms, preferably 4 to 6 carbon atoms, and polyhydric alcohols. Examples of useful dicarboxylic acids include: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids may be used individually or as mixtures, for example in the form of a succinic, glutaric and adipic acid mixture. To produce the polyester diols, it may be advantageous to use the corresponding dicarboxylic acid derivatives such as carboxylic diesters having from 1 to 4 carbon atoms in the alcohol radical, carboxylic anhydrides or carboxylic acid chlorides instead of the dicarboxylic acids. Examples of polyhydric alcohols are glycols having 2 to 10 and preferably 2 to 6 carbon atoms, for example ethylene glycol, diethylene glycol, butane-1,4-diol, pentane-1,5-diol, hexane-1,6-diol, decane-1,10-diol, 2,2-dimethylpropane-1,3-diol, propane-1, 3-diol and dipropylene glycol. Depending on the desired properties, the polyhydric alcohols may be used alone or in admixture with one another. Also suitable are esters of carbonic acid with the recited diols, in particular those having 4 to 6 carbon atoms, such as butane-1,4-diol or hexane-1,6-diol, condensation products of ω-hydroxycarboxylic acids such as ε-hydroxycaproic acid or polymerization products of lactones, for example optionally substituted ε-caprolactones. Polyester diols used are preferably ethanediol polyadipates, butane-1,4-diol polyadipates, ethanediol butane-1,4-diol polyadipates, hexane-1,6-diol neopentyl glycol polyadipates, hexane-1,6-diol butane-1,4-diol polyadipates, and polycaprolactones. The polyester diols have number-average molecular weights $\overline{M}_n$ of 500 to 10,000 g/mol, more preferably 600 to 6000 g/mol, and may be used individually or in the form of mixtures with one another.

Zerewitinoff-active polyols (III) are what are called chain extenders and have on average 1.8 to 3.0 zerewitinoff-active hydrogen atoms and have a number-average molecular weight $\overline{M}_n$ of 60 to 500 g/mol. This is understood to mean not only compounds having amino groups, thiol groups or carboxyl groups, but also those having two to three, preferably two, hydroxyl groups.

Chain extenders used are diols or diamines having a molecular weight of 60 to 495 g/mol, preferably aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol. Also suitable, however, are diesters of terephthalic acid with glycols having 2 to 4 carbon atoms, for example terephthalic acid bis-ethylene glycol or terephthalic acid bis-butane-1,4-diol, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, trior tetraalkyl-substituted 4,4'-diaminodiphenylmethanes. Chain extenders used with particular preference are ethanediol, butane-1,4-diol, hexane-1,6-diol, 1,4-di(β-hydroxyethyl)hydroquinone or 1,4-di(β-hydroxyethyl)bisphenol A. It is also possible to use mixtures of the abovementioned chain extenders. In addition, relatively small amounts of triols may also be added.

Compounds that are monofunctional toward isocyanates can be used in proportions of up to 2 wt %, based on thermoplastic polyurethane, as what are called chain terminators or demolding aids. Examples of suitable compounds are monoamines such as butyl- and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

The relative amounts of the compounds (II) and (III) are preferably chosen such that the ratio of the sum of the isocyanate groups in (I) to the sum of the zerewitinoff-active hydrogen atoms in (II) and (III) is 0.85:1 to 1.2:1, preferably 0.95:1 to 1.1:1.

The thermoplastic polyurethane elastomers (TPUs) used in accordance with the invention may comprise, as auxiliaries and additives, up to a maximum of 20 wt %, based on the total amount of TPUs, of the customary auxiliaries and additives. Typical auxiliary and additive substances are catalysts, pigments, colorants, flame retardants, stabilizers against aging and weathering effects, plasticizers, glidants and demolding agents, fungistatic and bacteriostatic substances and fillers and mixtures thereof.

Suitable catalysts are the customary tertiary amines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and similar and also in particular organic metal compounds such as titanic esters, iron compounds or tin compounds such as tin diacetate, tin dioctoate, tin dilaurate or the dialkyltin salts of aliphatic carboxylic acids such as dibutyltin diacetate or dibutyltin dilaurate or similar. Preferred catalysts are organic metal compounds, in particular titanate esters, iron compounds and tin compounds. The total amount of catalysts in the TPUs is generally about 0 to 5 wt %, preferably 0 to 2 wt %, based on the total amount of TPU.

Examples of further added substances are glidants, such as fatty acid esters, metal soaps thereof, fatty acid amides, fatty acid ester amides and silicone compounds, antiblocking agents, inhibitors, stabilizers against hydrolysis, light, heat and discoloration, flame retardants, dyes, pigments, inorganic and/or organic fillers and reinforcers. Reinforcers are in particular fibrous reinforcing materials, for example inorganic fibers, which are produced by prior art methods and may also be sized. Further details of the auxiliaries and additives mentioned can be found in the specialist literature, for example the monograph by J. H. Saunders and K. C. Frisch "High Polymers", volume XVI, Polyurethane, parts 1 and 2, Interscience Publishers 1962 and 1964, Taschenbuch für Kunststoff-Additive [Handbook of Plastics Additives] by R. Gächter and H. Müller (Hanser Verlag Munich 1990), or DE-A 29 01 774.

Further additions which may be incorporated into the TPU are thermoplastics, for example polycarbonates and acrylonitrile/butadiene/styrene terpolymers, in particular ABS. Other elastomers such as rubber, ethylene/vinyl acetate copolymers, styrene/butadiene copolymers and other TPUs may also be used.

Also suitable for incorporation are commercially available plasticizers such as phosphates, phthalates, adipates, sebacates and alkylsulfonic esters.

Polyethylene suitable in accordance with the invention is likewise known or producible by literature processes. The polyethylene may be not only PE-HD (HDPE), PE-LD (LDPE), PE-LLD (LLDPE), PE-HMW but also PE-UHMW.

The polypropylene, polyphenylene sulfone, polyetherimide and polyether ketone suitable in accordance with the invention is likewise also known or producible by literature processes.

In general, it may be advisable to add thermal stabilizers and flow improvers to the thermoplastic which is used for the matrix.

Fibers used in accordance with the invention are in particular natural fibers or manmade fibers or a mixture of the two. The natural fibers are preferably fibrous minerals or vegetable fibers, and the manmade fibers are preferably inorganic synthetic fibers or organic synthetic fibers. Glass, carbon or polymer fibers are preferred in accordance with the invention, glass or carbon fibers being preferred in turn.

Very particular preference is given to using glass fibers, especially having a modulus of elasticity of greater than 50 GPa, preferably greater than 70 GPa, or carbon fibers, especially having a modulus of elasticity of greater than 200 GPa, preferably greater than 230 GPa. Carbon fibers having these aforementioned properties are preferred in particular. Such carbon fibers are commercially available, for example, from Mitsubishi Rayon Co., Ltd. under the Pyrofil trade name.

The volume content of the fibers in the sheet materials averaged over the volume of the respective sheet material is from 20 to 80 vol %, preferably from 30 to 70 vol %, more preferably from 40 to 60 vol %, even more preferably from 42 to 55 vol %.

A typical impregnated fiber strip generally has, in running direction, a length of 100 to 3000 m, a width of 60 to 2100 mm, preferably of 500 to 1000 mm, more preferably of 600 to 800 mm, and a thickness of 100 to 350 μm, preferably of 120 to 200 μm. However, the apparatus of the invention can also be used to process an impregnated fiber strip of different dimensions.

If the thermoplastic used as matrix for the impregnated fiber strip is polycarbonate, the impregnated fiber strip on entry between the chill rolls is at a temperature of 200° C. to 400° C., preferably 250° C. to 350° C., more preferably 280° C. to 330° C. The chill rolls cool the impregnated fiber strip down to a temperature of 90° C. to 150° C., preferably 100° C. to 120° C. A further pair of chill rolls, which may have the configuration of the invention or a simpler configuration, lower the temperature of the impregnated fiber strip to a value of 50° C. to 90° C., preferably 70° C. to 80° C.

Suitable material for the rolls is, for example, steel, gray iron, brass or bronze, preferably steel, especially 1.1191 steel. The rolls may consist of solid material or be hollow on the inside. Suitable material for the gasket rings is, for example, hardened steel, gray iron, brass or bronze, especially gray iron.

The process of the invention corresponds to the process described in WO 2012 123 302 A1, especially the process described at page 1 line 26 to page 2 line 22, wherein the apparatus of the invention is used with free-wheeling chill rolls in the process of the invention.

The present invention also further provides an impregnated fiber strip that can be produced by the apparatus of the invention or the process of the invention.

It is a feature of the impregnated fiber strip of the invention that, in the edge regions, the thickness of the impregnated fiber strip differs only slightly, if at all, from the desired thickness of the cross section. More particularly, the thickness differs from the desired thickness of the impregnated fiber strip by not more than a maximum of 20%, preferably not more than a maximum of 10%, more preferably not more than a maximum of 5%, more preferably not more than a maximum of 2%. At the same time, the cross section of the impregnated fiber strip should differ only slightly, if at all, from the desired cross section of an elongated rectangle. This means that the desired thickness of the fiber strip should be the same across its entire width.

More particularly, it is a feature of the fiber strip of the invention that, in the edge regions, the thickness of the impregnated fiber strip is only slightly greater, if at all, than the desired thickness of the cross section. More particularly, the thickness is greater than the desired thickness of the impregnated fiber strip by not more than a maximum of 20%, preferably not more than a maximum of 10%, more preferably not more than a maximum of 5%, more preferably not more than a maximum of 2%.

It is then possible to use the fiber strip of the invention to provide a multilayer composite having an esthetically pleasing surface having low corrugation with simultaneously good mechanical properties. Such a multilayer composite constructed from fiber strips comprising polycarbonate as the matrix material exhibits metal-like tactile, optical and acoustic properties. The multilayer composite of the invention may be produced, for example, from the fiber strip of the invention by hot pressing or ultrasound of two or more mutually superposed plies of the fiber strip of the invention. A process for producing such a multilayer composite by means of ultrasound welding is described, for example, in PCT/EP2016/080870.

The invention therefore also further provides a multilayer composite produced from the fiber strip of the invention. Such a multilayer composite of the invention is suitable as a housing material for housings for electronic devices, in particular portable electronic devices such as laptops or smartphones, and for outer paneling and interior trim of automobiles, since such a multilayer composite can not only absorb mechanical load but also offers an excellent outward appearance.

FIG. 1 shows, in simplified form, the apparatus of the invention with a pair of chill rolls arranged one above the other, without any intention that the invention be restricted to the embodiment shown.

Figure 2:
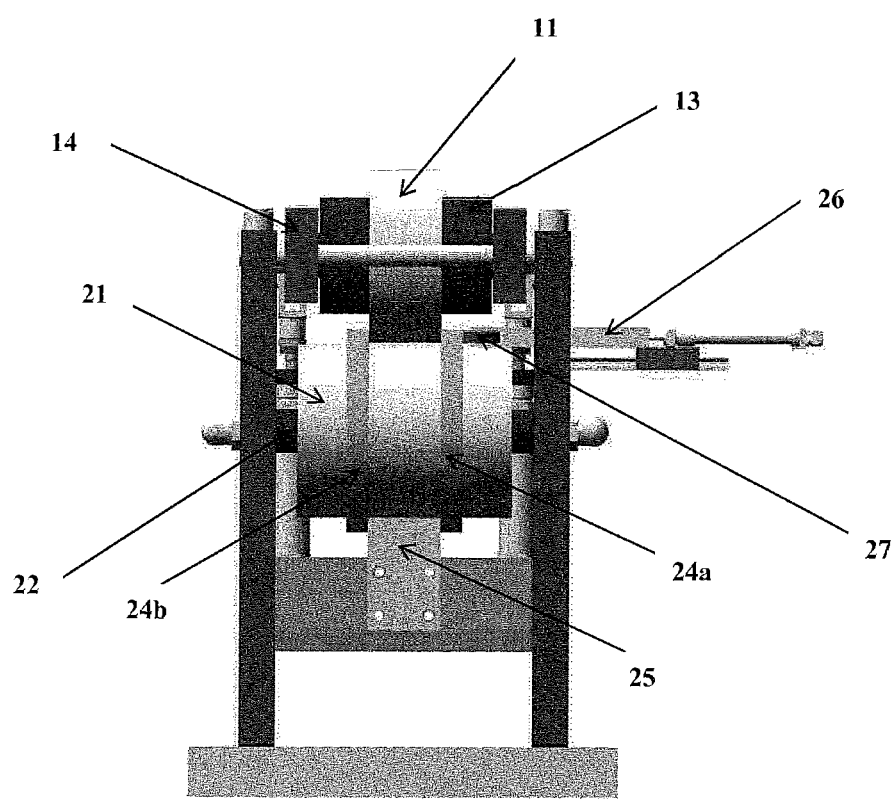
FIG. 2 shows, in simplified form, the apparatus of the invention with a pair of chill rolls arranged one above the other in a roll assembly.

FIG. 2 shows, in simplified form, the apparatus of the invention with a pair of chill rolls arranged one above the other in a roll assembly, without any intention that the invention be restricted to the embodiment shown.

Figure 3:
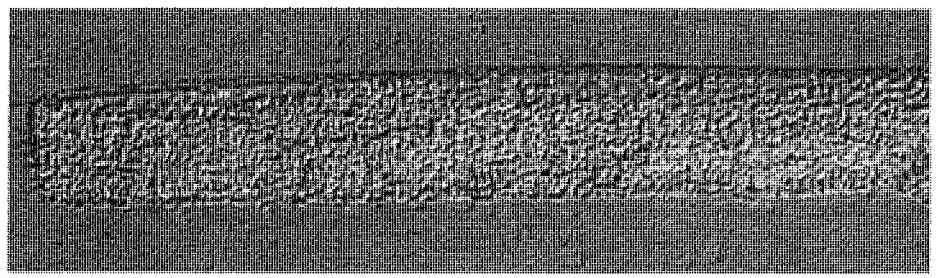
FIG. 3 shows an about 4.1 mm-wide section from the edge region of an impregnated fiber strip of the invention produced with the apparatus of the invention, comprising the section through an outer edge of the impregnated fiber strip.

FIG. 3 shows an about 4.1 mm-wide section from the edge region of an impregnated fiber strip of the invention produced with the apparatus of the invention, comprising the section through an outer edge of the impregnated fiber strip. It is clearly apparent that the thickness of the fiber strip is virtually the same at all points, i.e. the differences are only very small. At the same time, the cross section of the impregnated fiber strip differs only slightly from the desired cross section of an elongated rectangle.

Figure 4:
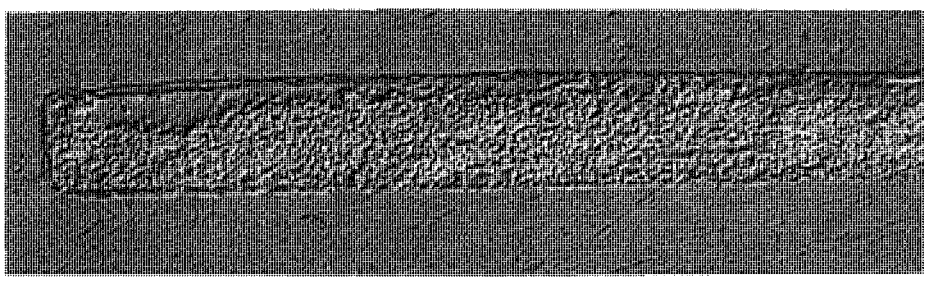
FIG. 4 shows an about 4.3 mm-wide section from the edge region of an impregnated fiber strip of the invention produced with the apparatus of the invention, comprising the section through an outer edge of the impregnated fiber strip.

FIG. 4 shows an about 4.3 mm-wide section from the edge region of an impregnated fiber strip of the invention produced with the apparatus of the invention, comprising the section through an outer edge of the impregnated fiber strip. It is clearly apparent that the thickness of the fiber strip is virtually the same at all points, i.e. the differences are only very small. At the same time, the cross section of the impregnated fiber strip differs only slightly from the desired cross section of an elongated rectangle.

Figure 5:
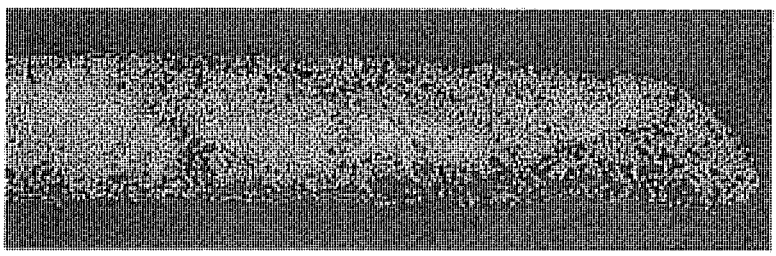
FIG. 5 shows an about 1 mm-wide section from the edge region of an impregnated fiber strip produced with an apparatus from the prior art, comprising the section through an outer edge of the impregnated fiber strip.

FIG. 5 shows an about 1 mm-wide section from the edge region of an impregnated fiber strip produced with an apparatus from the prior art, comprising the section through an outer edge of the impregnated fiber strip. The apparatus does not have any gasket rings. It is clearly apparent that the thickness of the fiber strip becomes less and less toward the edge region, i.e. the cross section of the impregnated fiber strip differs ever more significantly from the desired cross section of an elongated rectangle. Also clearly apparent is the large amount of trapped air (dark regions within the fiber strip).

The reference numerals have the following meanings:
11 upper roll
12 axis of the upper roll
13 roller arranged on the upper roll
14 reset device 21 lower roll
22 axis of the lower roll
23 roller arranged on the lower roll
24a first gasket ring
24b second gasket ring
25 spacer
26 spacer device
27 wheel of the spacer device

The invention claimed is:

1. An apparatus for producing a polymer-impregnated fiber strip,
    wherein the apparatus has two axially parallel rolls between which the fiber strip can run through a gap,
    wherein these rolls are not driven either directly or indirectly by a drive apparatus and the rolls do not transmit any force in a forward direction of the impregnated fiber strip,
    wherein at least one of the rolls is movably mounted in the direction of a theoretical axis that intersects perpendicularly with the axes of both rolls,
    wherein the movably mounted axis has been provided with a resilience apparatus,
    wherein at least one of the rolls has two gasket rings disposed on and coaxially to the roll in question,
    and wherein there is a clearance in each case between the roll and a gasket ring, and the clearance is between 0 and 200 μm.

2. The apparatus as claimed in claim 1, wherein each gasket ring has a spacer device or contact pressure device.

3. The apparatus as claimed in claim 1, wherein the two gasket rings are identical.

4. The apparatus as claimed in claim 1, wherein each of the gasket rings has a bevel.

5. The apparatus as claimed in claim 1, wherein a spacer is disposed between the gasket rings.

6. The apparatus as claimed in claim 1, wherein, of the two rolls, a length of a longer roll completely overlaps a length of a shorter roll.

7. The apparatus as claimed in claim 1, wherein, of the two rolls, a shorter roll is arranged centrally relative to a longer roll.

8. The apparatus as claimed in claim 1, wherein the clearance is from 12 to 56 μm.

9. A process for producing for a polymer-impregnated fiber strip, wherein an apparatus as claimed in claim 1 is used.

* * * * *